(12) United States Patent
Kowalski

(10) Patent No.: US 7,726,428 B2
(45) Date of Patent: Jun. 1, 2010

(54) A/C CONDENSER DAMAGE PROTECTION DEVICE

(75) Inventor: Jerome E Kowalski, Milford, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 647 days.

(21) Appl. No.: 11/248,112

(22) Filed: Oct. 12, 2005

(65) Prior Publication Data

US 2007/0080009 A1     Apr. 12, 2007

(51) Int. Cl.
*B60K 11/04* (2006.01)
(52) U.S. Cl. .................................. 180/68.6; 180/68.4
(58) Field of Classification Search ............... 180/68.4, 180/68.6; 293/112, 115
See application file for complete search history.

(56) References Cited

U.S. PATENT DOCUMENTS

| | | | | |
|---|---|---|---|---|
| 2,542,238 A | * | 2/1951 | Dreyfuss | 428/596 |
| 3,933,136 A | * | 1/1976 | Burst | 123/41.58 |
| 4,081,050 A | * | 3/1978 | Hennessey et al. | 180/233 |
| 4,334,588 A | * | 6/1982 | Tezuka et al. | 180/68.6 |
| 4,957,325 A | * | 9/1990 | Engel | 296/180.2 |
| 5,476,138 A | * | 12/1995 | Iwasaki et al. | 165/41 |
| 6,460,909 B2 | * | 10/2002 | Mansoor et al. | 293/120 |
| 2002/0096378 A1 | * | 7/2002 | Kobayashi | 180/68.6 |
| 2003/0094260 A1 | | 5/2003 | Whitlow et al. | |

* cited by examiner

*Primary Examiner*—Paul N Dickson
*Assistant Examiner*—Katy Meyer
(74) *Attorney, Agent, or Firm*—Ralph E. Smith

(57) ABSTRACT

A device protects at least a portion of an A/C condenser of an automotive vehicle against damage from stones and other road debris. The device includes a guard having a plurality of spaced apart louvers for intercepting and deflecting the stones and other road debris but permitting air to pass through the guard between the louvers.

16 Claims, 3 Drawing Sheets

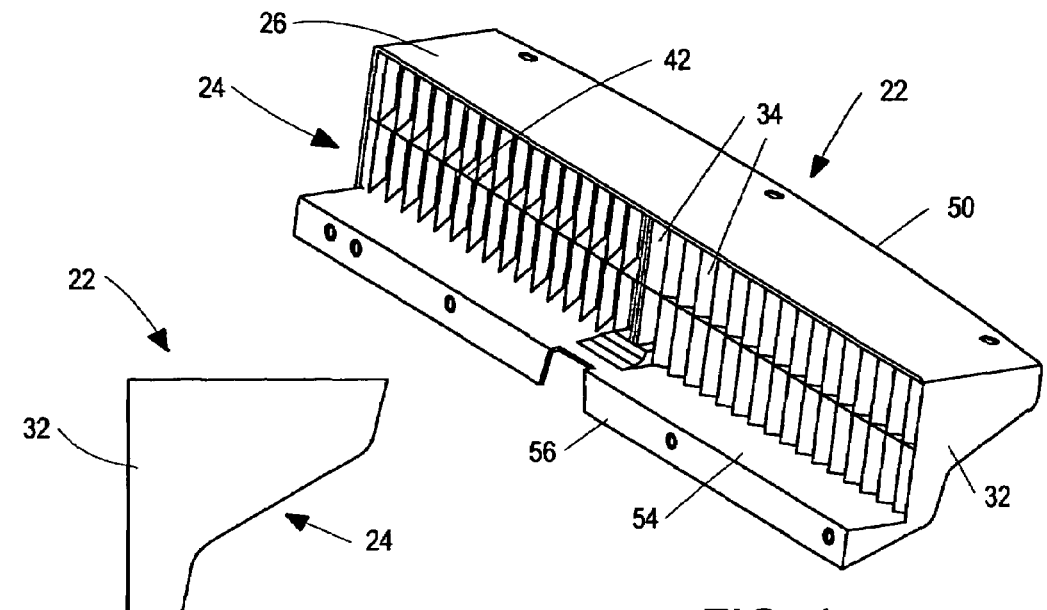
FIG. 4
FIG. 5
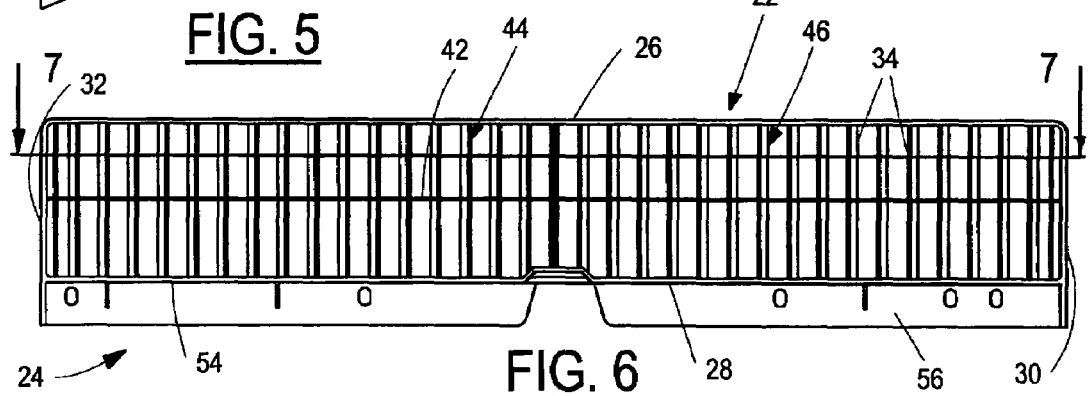
FIG. 6
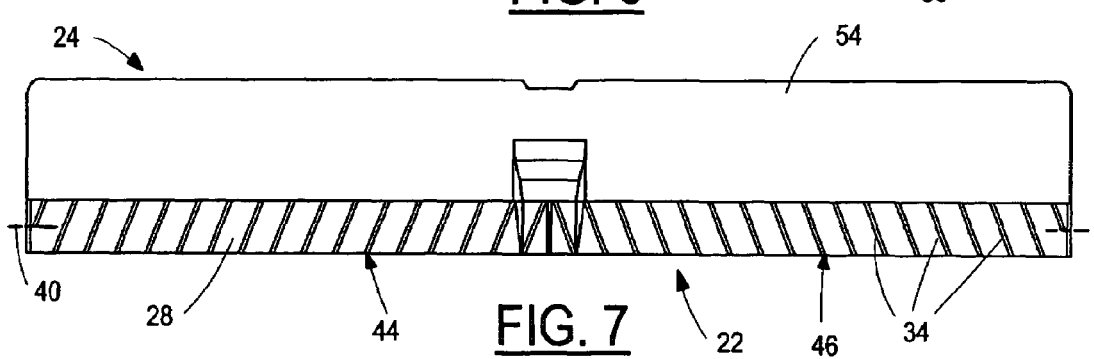
FIG. 7

A/C CONDENSER DAMAGE PROTECTION DEVICE

FIELD OF THE INVENTION

The present invention relates generally to damage protection devices and more particularly to a device for protecting an air conditioning (A/C) condenser of an automotive vehicle against damage from stones and other road debris.

BACKGROUND OF THE INVENTION

An A/C condenser of an automotive vehicle can be damaged by stones and other road debris if not properly protected. Some protection devices in present use have not performed adequately. Others have been mounted on the fascia of the vehicle. Because different vehicles often have different fascias, a protection device mounted on a facia has to be custom made to fit each different fascia design.

SUMMARY OF THE INVENTION

In accordance with the present invention, a device is provided for protecting at least a portion of an A/C condenser against damage from stones and other road debris. The device includes a guard having a plurality of louvers for intercepting and deflecting the stones and other road debris but permitting air to pass through the guard between the louvers.

Preferably the guard comprises an elongated frame and the louvers are disposed in side-by-side relation to one another in a row extending lengthwise of the frame along a central plane thereof.

In the preferred embodiment disclosed herein, the frame extends transversely of the vehicle between the condenser and a front fascia, and is secured to a bumper beam. Also, the louvers are preferably slanted at an acute angle to the central plane of the panel.

One object of this invention is to provide a condenser protection device having one or more of the foregoing features and capabilities.

Other objects, features and advantages of the invention will become apparent as the following description proceeds.

Further areas of applicability of the present invention will become apparent from the detailed description provided hereinafter. It should be understood that the detailed description and specific examples, while indicating preferred embodiments of the invention, are intended for purposes of illustration only and are not intended to limit the scope of the invention.

BRIEF DESCRIPTION OF THE DRAWINGS

The present invention will become more fully understood from the detailed description and accompanying drawings, wherein:

FIG. 4 is a perspective view of the protection device as seen from the rear;

FIG. 5 is an end view of the protection device;

FIG. 6 is a front view of the protection device; and

FIG. 7 is a sectional view taken on the line 7-7 in FIG. 6.

DETAILED DESCRIPTION OF THE PREFERRED EMBODIMENT

Figure 1:
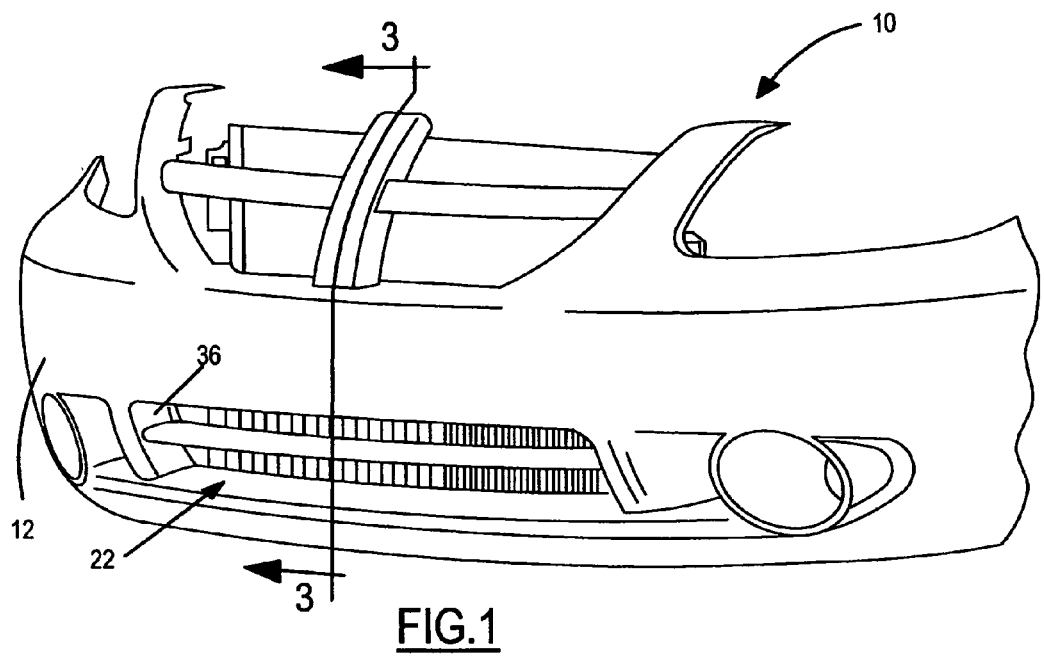
FIG. 1 is a fragmentary front perspective view of a vehicle having a protection device constructed in accordance with the invention.
Figure 2:
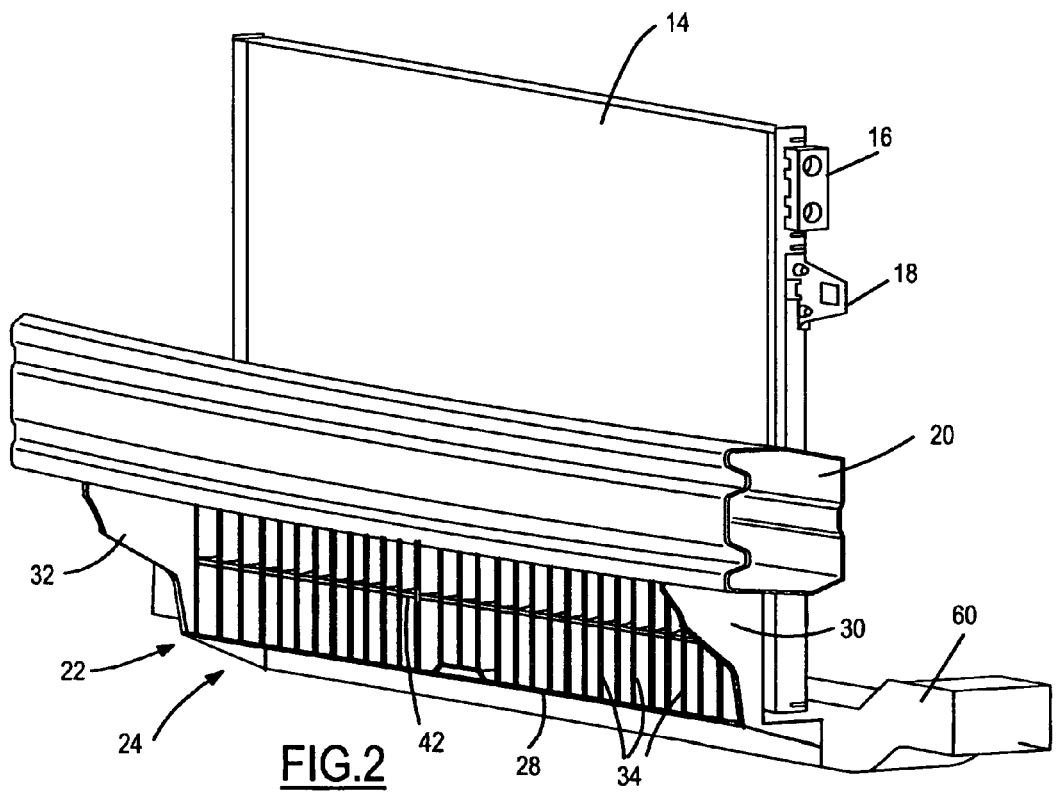
FIG. 2 is a fragmentary perspective view showing the protection device secured to a bumper beam in front of an A/C condenser.
Figure 3:
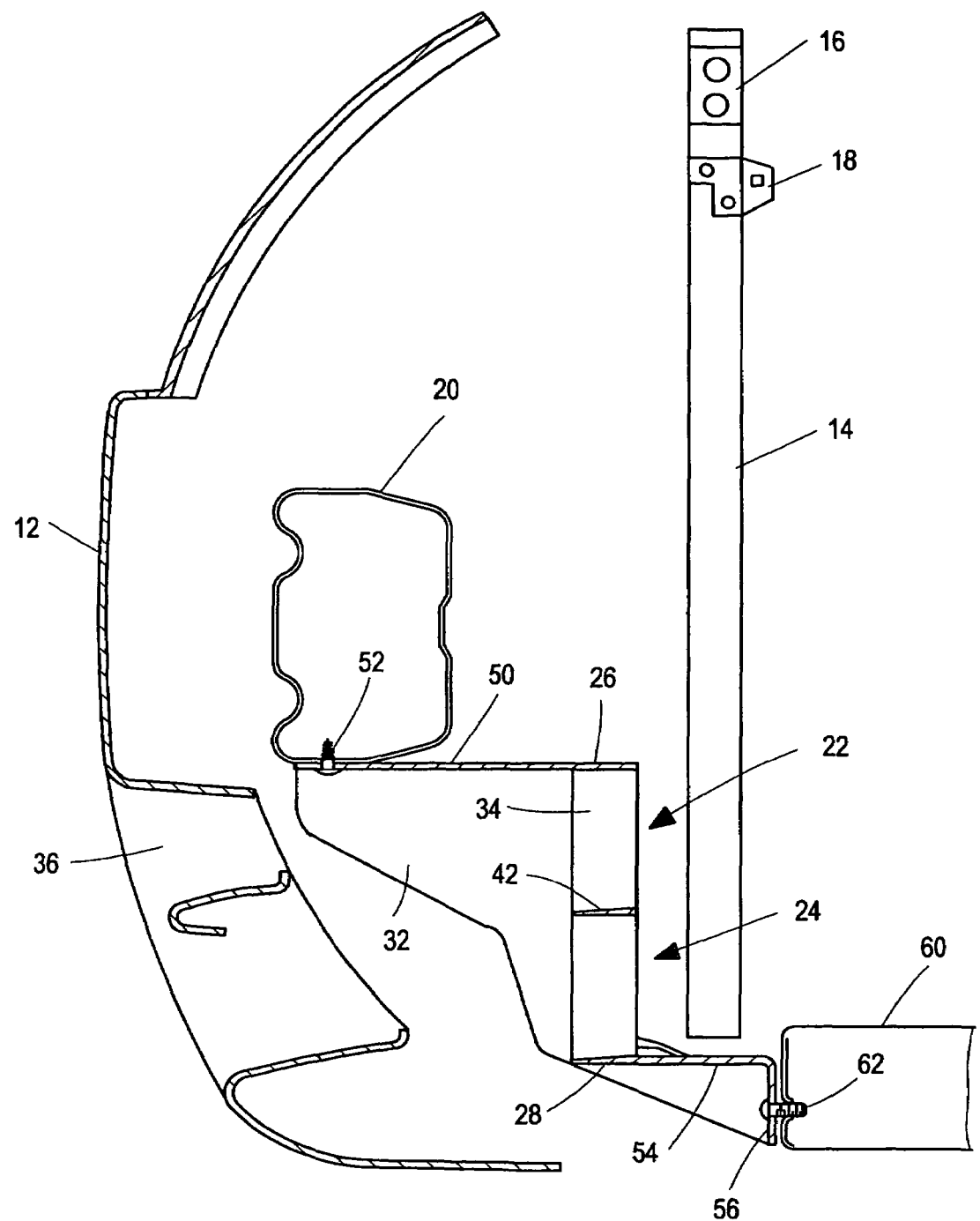
FIG. 3 is a sectional view taken on the line 3-3 in FIG. 1.

The following description of the preferred embodiment is merely exemplary in nature and is in no way intended to limit the invention, its application, or uses.

Referring now more particularly to the drawings, a vehicle 10 is shown having a front fascia 12 and an A/C condenser 14 behind the fascia. The condenser 14 is supported in an upright position by brackets 16 and 18 on the condenser which attach to certain vehicle support structure (not shown). A transverse bumper beam 20 is disposed between the fascia 12 and the condenser 14.

A protection device 22 is provided for protecting a lower portion of the condenser 14 against damage from stones and other road debris as the vehicle is traveling along a highway. The protection device 22 comprises a guard in the form of an elongated horizontal frame 24 which is spaced from the fascia 12 and extends transversely of the vehicle across the front of the condenser. The frame is generally upright and has a horizontal top frame member 26, a horizontal bottom frame member 28 and vertical end frame members 30 and 32. The frame 24 is disposed close to the condenser 14 and has a plurality of flat vertical louvers 34 the upper and lower ends of which are secured to the top and bottom frame members 26 and 28. The louvers 34 serve to intercept and deflect the stones and other road debris away from the condenser. The louvers 34 are equally spaced from one another and allow air entering through the fascia opening 36 to pass through the panel between the louvers.

The louvers 34 are disposed in side-by-side relation to one another in a row extending from one of the end frame members 30, 32 to the other lengthwise of the frame along a central vertical plane 40 thereof.

The louvers 34 are interconnected by a horizontal web 42 midway between the tops and bottoms of the louvers. One set 44 of the louvers covering one-half of the length of the frame are parallel to one another and are turned or slanted with respect to the central plane 40 of the frame in one direction, while another set 46 of the louvers covering the other half of the length of the frame are parallel to one another and are turned or slanted in an opposite direction. Preferably, and as seen in FIG. 7, the louvers are slanted at an acute angle to the central plane of the frame preferably about 30 degrees, and are about three fourths of one (1) inch apart.

The guard has a forward extension of the top frame member 26 forming a horizontal top flange 50. The flange 50 is rigidly secured to the underside of the bumper beam 20 as by push pins 52. The guard has a rearward extension of the bottom frame member 28 forming a horizontal bottom flange 54. The flange 54 has a vertically down-turned lip 56 which is rigidly secured to a structural cross member 60 of the vehicle as by screws 62.

Stones and other road debris will be intercepted by the protection device 22 and deflected away from the condenser. Even relatively small stones or particles of debris will not pass through the protection device because of the close spacing of the louvers, and yet air entering through the fascia opening 36 will readily pass between the louvers.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A device for protecting at least a portion of an A/C condenser of an automotive vehicle against damage from stones and other road debris, said device comprising:

a guard having a plurality of spaced apart louvers spaced closely enough to intercept and deflect the stones and other road debris but permitting air to pass through the guard between the louvers, wherein said guard comprises an elongated frame carrying the louvers and the louvers are disposed in side-by-side relation to one another in a row extending lengthwise of the frame along a central plane thereof, wherein said louvers are slanted at an acute angle to the central plane of the frame, and wherein a first set of said louvers are parallel to one another and slanted in one direction and a second set of said louvers are parallel to one another and slanted in another direction, and wherein the elongated frame and plurality of sets of louvers form a guard of unitary construction that is disposed forwardly of, adjacent to, and generally in-line with the condenser and rearwardly of and adjacent to an opening in a front fascia of the automotive vehicle that is disposed in a front end of the automotive vehicle that allows air entering through the fascia opening to pass between the louvers through the guard and be directed to the condenser, and wherein the frame is attached to a structural cross-member of the vehicle adjacent the condenser and rearwardly of the front fascia and wherein no portion of the frame is in contact with the front fascia.

2. The device of claim 1, wherein said louvers of both of said sets are spaced apart a distance of approximately three fourths of one (1) inch.

3. A device for protecting at least a portion of an A/C condenser of an automotive vehicle against damage from stones and other road debris, wherein the condenser is disposed rearwardly of a front fascia of the vehicle and a bumper beam is disposed between the front fascia and the condenser, said device comprising:

a guard between the fascia and the condenser comprised of a horizontally extending frame and a plurality of spaced apart louvers carried by the frame that intercepts and deflects stones and other road debris and that permits air to pass through the guard between the louvers, said guard being rearwardly spaced from the fascia and mounted on the bumper beam rearwardly of the front fascia and forwardly of and adjacent the condenser;

wherein louvers overlie a portion of the condenser and there are louvers extending substantially along the entire transverse length of the condenser; and wherein the frame and louvers define a guard of unitary construction that is recessed such that no portion extends outwardly from the front fascia, and wherein said frame comprises an elongated horizontal frame which extends transversely of the vehicle and is disposed between the front fascia and the condenser, the frame has a horizontal top frame member and a horizontal bottom frame member, and the louvers have upper and lower ends secured respectively to the top and bottom frame members and are disposed in side-by-side relation to one another in a row extending lengthwise of the frame along a central plane thereof, and wherein the frame has a top flange fixed to the bumper beam.

4. The device of claim 3, wherein the frame has a bottom flange fixed to a structural cross member of the vehicle.

5. The device of claim 4, wherein said louvers are slanted at an acute angle to the central plane of the frame.

6. The device of claim 5, wherein a first set of said louvers are parallel to one another and slanted in one direction and a second set of said louvers are parallel to one another and slanted in an opposite direction.

7. The device of claim 6, wherein said louvers of both of said sets are spaced apart a distance of approximately three fourths of one (1) inch, and are slanted at an angle of about 30 degrees to a central plane of the frame.

8. The device of claim 1, wherein each louver has an upper end and a lower end, and further including a web interconnecting the louvers intermediate the respective upper and lower ends thereof.

9. The device of claim 3, wherein each louver has an upper end and a lower end, and further including a web interconnecting the louvers intermediate the respective upper and lower ends thereof.

10. The device of claim 9, wherein said louvers are slanted at an acute angle to the central plane of the frame.

11. The device of claim 10, wherein a first set of said louvers are parallel to one another and slanted in one direction and a second set of said louvers are parallel to one another and slanted in an opposite direction.

12. The device of claim 11, wherein said louvers of both of said sets are slanted at an angle of about 30 degrees to a central plane of the frame.

13. A device for protecting at least a portion of an A/C condenser of an automotive vehicle against damage from stones and other road debris in combination with an A/C condenser disposed in an automotive vehicle, the combination comprising:

(a) an A/C condenser disposed rearwardly of a generally transversely extending and elongate bumper beam having top and bottom edges that is disposed rearwardly of a front fascia of a front end of the vehicle with the front fascia having an elongate and generally transversely extending fascia opening formed therein extending along a portion of one of the top and bottom edges of the bumper beam and the condenser disposed forwardly of a generally transversely extending structural cross member;

(b) a device comprised of a guard disposed rearwardly of the fascia and generally overlying the fascia opening, the guard comprising (1) a plurality of generally upwardly oriented elongate louvers disposed in-line with the fascia opening and rearwardly of the bumper beam with a first plurality of louvers disposed along a portion of one side of the condenser and a second plurality of louvers disposed along a portion of an opposite side of the condenser, and (2) a frame carrying the louvers that has a first flange outwardly extending generally toward the bumper beam and that is connected to the bumper beam and a second flange outwardly extending toward the structural cross member and that is connected to the structural cross member; and wherein the guard is interiorly disposed in the front end of the automotive vehicle such that no portion of the guard extends outwardly of the front fascia.

14. The combination of claim 13, wherein each one of the louvers extends vertically and is generally parallel to the condenser and the condenser is generally vertically oriented.

15. The combination of claim 14, wherein the first one of the flanges extends generally horizontally and forwardly to the bumper beam and is fixed thereto and wherein the second one of the flanges extends generally horizontally and rearwardly to the structural cross member and is fixed thereto.

16. The combination of claim 15, wherein the first plurality of louvers is acutely angled at a first angle relative to a central plane, wherein the second plurality of louvers is acutely angled at a second angle relative to the central plane, and further comprising an elongate generally horizontal louver-interconnecting web generally horizontally connecting the louvers.

* * * * *